Oct. 15, 1935.  G. L. PARKHURST  2,017,568
PROCESS OF MANUFACTURING A FLAME RESISTANT CLEANING FLUID
Filed March 12, 1932
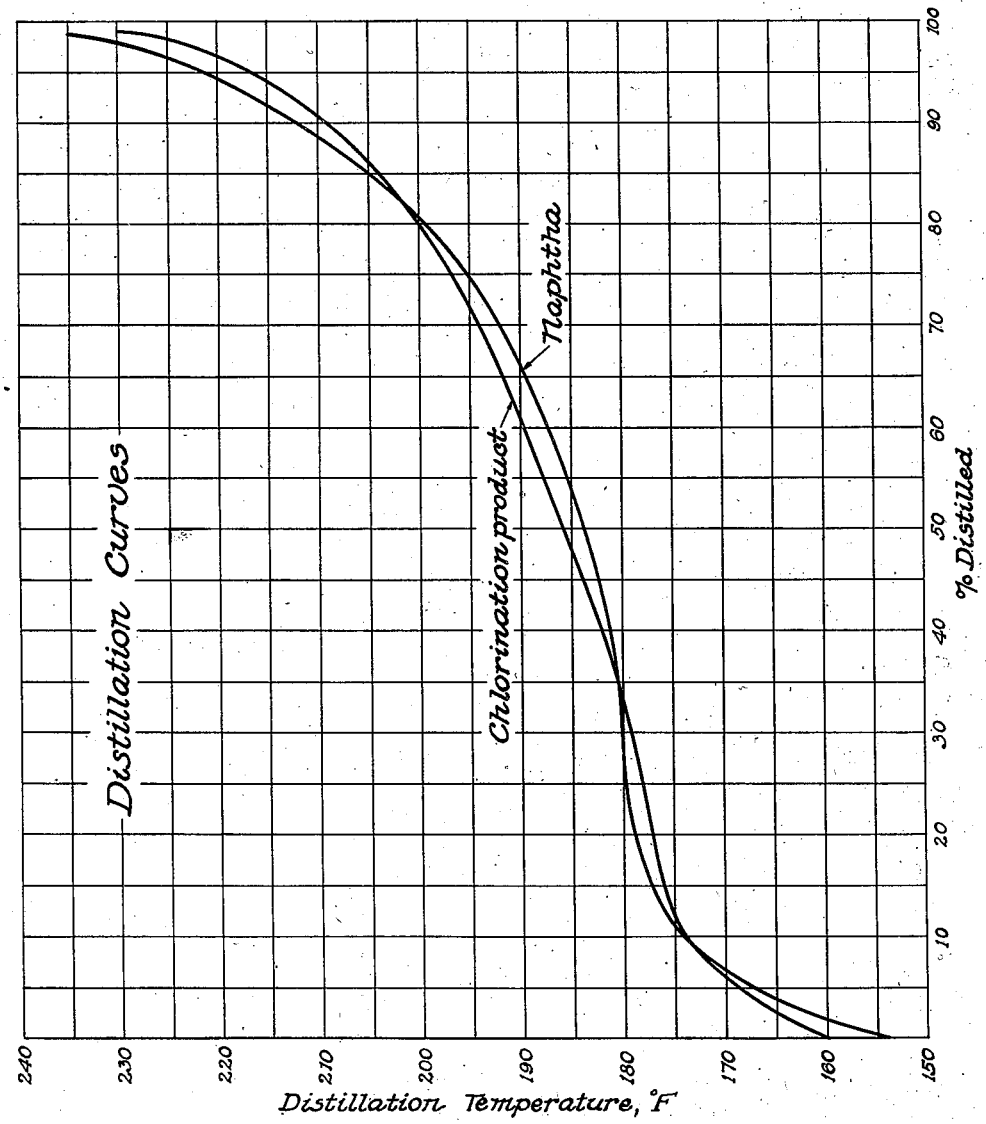
INVENTOR
George L. Parkhurst Patented Oct. 15, 1935

2,017,568

UNITED STATES PATENT OFFICE 2,017,568

PROCESS OF MANUFACTURING A FLAME RESISTANT CLEANING FLUID

George L. Parkhurst, Chicago, Ill., assignor to Standard Oil Company, Chicago, Ill., a corporation of Indiana Application March 12, 1932, Serial No. 598,358

9 Claims. (Cl. 87—5)

This invention concerns a non-flammable or difficultly flammable solvent mixture and a process for producing the same. More particularly it concerns a non-flammable or difficultly flammable solvent mixture comprising a liquid chlorination product of selected distillation characteristics.

One object of my invention is to produce an inexpensive and efficient solvent mixture of flame resistant character suitable for various solvent purposes and especially for the dry cleaning of textile fabrics. More particularly, an object of my invention is to produce a non-flammable or difficultly flammable solvent mixture, suitable for the purposes mentioned, by the selection of a fraction of certain specified distillation characteristics from the liquid products of the intensive chlorination of hydrocarbon gases.

Another object of my invention is to produce a blend of flammable and non-flammable solvent mixtures each boiling throughout a wide range of distillation temperatures, said distillation ranges being preferably substantially identical. In other words, my object is to produce a blend of a petroleum naphtha and a liquid chlorination product wherein the naphtha and the liquid chlorination product are substantially inseparable by distillation. Further objects of my invention will become apparent as the description thereof proceeds.

It has long been known to use non-flammable chlorinated solvents, simple mixtures thereof and blends of such materials with hydrocarbon mixtures, as dry cleaning solvents. However, such products have been expensive to produce and have been generally unsatisfactory. When using pure chlorinated solvents or simple mixtures thereof it has been found that the solvent action is too vigorous in certain cases, that the odor and toxicity characteristics are unsatisfactory and that the lack of a wide range of distillation temperatures and a smooth distillation curve leads to too rapid drying, consequent "spotting" and uneven work, particularly when used in the home. Moreover, when these chlorinated solvents have been blended with hydrocarbon mixtures such as petroleum naphthas to improve their solvent properties and reduce the undesirable effects above mentioned, it has been found difficult or impossible to obtain a product in which the hydrocarbons or chlorinated solvents will not concentrate on evaporation (as for instance in the drying of garments which have been dry cleaned with such a blend) thereby producing a fire hazard at some stage in the evaporation.

My invention overcomes these difficulties by producing a blend of a very large number of unidentified chlorinated bodies in the form of a mixture having a wide but selected range of distillation temperatures and a smooth distillation curve. Such a mixture has been found to be relatively inexpensive and to have superior dry cleaning qualities as well as improved odor and toxicity characteristics. Moreover this material can be blended with a corresponding petroleum naphtha as hereinafter described to give a blended product of superior quality which will remain flame resistant throughout the course of a fractional distillation operation or simple evaporation.

When hydrocarbon gases, particularly such mixtures of hydrocarbon gases as occur in natural gases or gases produced by the distillation and/or cracking of petroleum, are made to react with chlorine under vigorous chlorination conditions a liquid chlorination product is normally produced which has a wide range of distillation temperatures. Moreover when a distillation curve is drawn for such a product by plotting distillation temperatures against percentages evaporated, it is found that this curve is a smooth one similar in type to that produced in the distillation of a corresponding petroleum fraction. This is indicative of the fact that this type of liquid chlorination product is composed of a very large number of chemical individuals having a great variety of boiling points. In fact it is difficult, if not impossible, to segregate pure individual chemical compounds from such a mixture.

I prefer to produce this complex liquid chlorination product by a modification and improvement of the process of U. S. Patent No. 1,520,506 which issued on December 23, 1924 to Elmer H. Payne and Samuel A. Montgomery. My modification of that process comprehends an improved type of charging stock.

A process for the chlorination of hydrocarbon gases can most conveniently be conducted in or near a petroleum refinery and it will often be desired to use as a charging stock the complex gaseous hydrocarbon mixtures available at refineries. These mixtures will commonly comprise hydrocarbons having one, two, three and more carbon atoms per molecule.

I have found that highly superior results can be obtained by eliminating, prior to chlorination, molecules having more than two carbon atoms. This can be accomplished, for example, by fractionation of a refinery gas in a bubble tower at low temperatures and/or high pressures in order to obtain a product substantially free from molecules having more than two carbon atoms. An example of a commercial process for the separation of methane and ethane from propane and butanes occurring with them in a refinery gas is described on page 159 of the "Refiner and Natural Gasoline Manufacturer (Process Section) for February, 1932 (Vol. 11, No. 2). The advantage of using material substantially free from molecules having more than two carbon atoms as a charging stock for a chlorination process is that chlorination products of the higher hydrocarbon gases are not produced. This results in a more highly flame resistant chlorination product since the chlorination products of the higher hydrocarbon gases corresponding in boiling point to the non-flammable chlorine derivatives of methane and ethane are only slightly chlorinated and are therefore distinctly flammable. Due to this, similarity of boiling point it is difficult or impossible to separate the non-flammable methane and ethane derivatives from the flammable chlorination products of the higher hydrocarbon gases with the result that the whole product is rendered less flame resistant. If, on the other hand, the higher hydrocarbon gases present in refinery gas are more-or-less completely chlorinated very high-boiling compounds are produced which are relatively undesirable and which may interfere with the chlorination process.

By applying the process of the aforementioned patent to a refinery gas from which hydrocarbons having more than two carbon atoms to the molecule have been removed, a liquid chlorination product can be produced giving the following typical range of distillation temperatures when tested in accordance with the procedure approved by the American Society for Testing Materials under Designation: D86—30:

| Percent distilled | Distillation temperature |
| --- | --- |
|  | °F. |
| 0 | 130 |
| 10 | 167 |
| 20 | 172 |
| 30 | 180 |
| 40 | 186 |
| 50 | 196 |
| 60 | 215 |
| 70 | 234 |
| 80 | 249 |
| 90 | 256 |
| 99 | 325 |

This product can be refined by washing with caustic soda solution and water and may if desired be further purified by redistillation, preferably with steam. It can then be used directly as a cleaning fluid or may be blended with naphtha for use as a cleaning fluid in accordance with the principles discussed hereinafter.

However, I have found that it is highly desirable to remove a certain amount of the more volatile constituents by fractional distillation. These more volatile constituents make the product more difficult to work with as a cleaning fluid and furthermore they are less flame resistant than those having slightly higher distillation temperatures. I have found it desirable to remove sufficient of the most volatile constituents to leave a product having an initial distillation temperature of at least 150° F. and preferably 160° F. Furthermore, I have found it desirable to remove a small amount of the heaviest constituents by fractional distillation in order to obtain a cleaning fluid which will dry readily and which will not leave disagreeable odors in the fabrics cleaned. I have found that the final distillation temperature of this type of product should, in the ideal case, not be greater than 310° F.

Although I have described the product of a particular type of chlorination process using a particular type of charging stock which gives highly superior results, it is to be understood that many other chlorination processes, particularly those operating under intensive chlorination conditions upon mixtures of gaseous hydrocarbons, will produce liquid chlorination products having wide ranges of distillation temperatures and smooth distillation curves, and that many of these products can be used as crude materials from which to manufacture the cleaning fluid of my invention by fractional distillation. Some of these processes will produce liquid chlorination products having much wider distillation ranges than those above mentioned.

In general I have found that the most desirable cut for use as a dry cleaning fluid is one having an initial distillation temperature of not less than 150° F. nor more than 275° F. and a maximum distillation temperature of not less than 195° F. nor more than 350° F. Furthermore this cut should have a smoothly distributed range of distillation temperatures between initial and maximum distillation temperatures and this range of distillation temperatures should be not less than 45° F. nor more than 180° F. Narrower ranges tend to given uneven dry cleaning and wider ranges are difficult to work with since there is either too much evaporation in the early stages of the drying operation or too slow an evaporation in the final stages.

Although distillation characteristics within any of these ranges are generally satisfactory it has been found preferable to keep them within somewhat more narrow limits as follows:

°F.
Initial distillation temperature_____160 to 215
Maximum distillation temperature_____ 215 to 310
Range of distillation temperature_____ 60 to 150

A product having distillation characteristics falling within the above mentioned limits will not only have superior cleaning qualities but will also have a maximum flame resistance due to the very low flammability of the chlorination products falling within these distillation limits.

As specific examples of suitable products produced by the fractional distillation of liquid products of the chlorination of gaseous hydrocarbons the following may be mentioned:

|  | A | B | C | D |
| --- | --- | --- | --- | --- |
| Initial distillation temperature | 150° F. | 160° F. | 205° F. | 170° F. |
| Maximum distillation temperature | 240° F. | 285° F. | 310° F. | 320° F. |

My invention also comprises the blending of a product such as those just described with a petroleum naphtha or other mixture of hydrocarbons. It is well known in the petroleum art that hydrocarbon mixtures having any desired range of distillation temperatures can be produced by suitable fractionation means. Such hydrocarbon mixtures are commercially available in a great variety of distillation ranges. That type of hydrocarbon mixture with which my invention is primarily concerned is customarily known as naphtha.

My invention comprehends blending a selected fraction of liquid products of the chlorination of hydrocarbon gases with a naphtha having substantially the same range of distillation temperatures. This has the advantage of making the blended product non-flammable or flame resistant at all stages during its distillation. Thus, for example, in the dry cleaning of textile fabrics the residue of solvent on the fabric at any stage in the dry cleaning thereof will be non-flammable or at least flame resistant. Furthermore, it will be found that the blended product is much less toxic, less odorous and less expensive than the liquid chlorination product itself.

Various proportions of naphtha can be used in making such a product. In general it is desirable to use from 5 to 60% of naphtha. When using small percentages of naphtha, it is possible to produce a solvent which is substantially non-flammable and non-explosive under any normal conditions; when using larger amounts of naphtha the product becomes more flammable but remains flame resistant so that is very much safer to use than is the naphtha itself.

It is generally desirable that the naphtha and the liquid chlorination product have substantially the same range of distillation temperatures. Under the ideal conditions it is desirable that their distillation curves not only lie between the same limiting points but that they be substantially identical thruout. This can be achieved by careful selection of a naphtha having a distillation curve similar to that of the chlorination product or by blending two or more naphthas in order to achieve a blend having the desired distillation characteristics.

In some cases it is desirable to insure non-flammability of the product in its original form by including chlorination products lower in distillation temperature than any of the constituents of the naphtha. This can be done by having the initial distillation temperature of the liquid chlorination product from 3 to 20° F. lower than the initial distillation temperature of the naphtha. Furthermore, in order to insure that the final distillation residue will be as thoroughly non-flammable or flame resistant as possible, it is sometimes desirable that the final distillation temperature of the liquid chlorination products be slightly higher than that of the naphtha. In this case also a differential of from 3 to 20° F. is generally suitable. It is also apparent that both of these added advantages can be obtained by choosing a liquid chlorination product having an initial boiling point of from 3 to 20° F. lower than the initial boiling point of the naphtha with which it is blended and a final distillation temperature of from 3 to 20° F. higher than that of the naphtha with which it is blended.

The figure shows the distillation curves of a selected petroleum naphtha and a selected fraction of a liquid chlorination product prepared in accordance with the preferred embodiment of my invention. It will be noted that the two distillation curves are close together throughout their entire range, thereby assuring that there will be no substantial separation of the two component materials at any stage of evaporation or fractional distillation. It will also be noted that the initial distillation temperature of the chlorination product is slightly lower than that of the naphtha and that the reverse is true at the other end of the distillation curve. This insures that the chlorination product will predominate in the initial vapors, rendering them highly flame resistant, and also in the final residue left on the cleaned fabrics, thereby avoiding any abnormal flammability of the fabric following the cleaning operation.

The expression "intensive chlorination" as used herein refers to a process producing predominantly, molecules containing at least two and preferably more than two chlorine atoms.

Although my invention has been described in connection with certain specific embodiments thereof, it is to be understood that I do not wish to be restricted thereby except to the scope of the appended claims.

I claim:

1. Process of manufacturing a flame resistant solvent mixture suitable for use in dry cleaning comprising intensively chlorinating a mixture of normally gaseous hydrocarbons, separating liquid chlorination products, fractionally distilling said liquid chlorination products, selecting from the products of said fractional distillation a cut having an initial distillation temperature substantially within the range 160° F. to 215° F., a maximum distillation temperature substantially within the range 215° F. to 310° F., and a range of distillation temperatures of from 60° F. to 150° F., and blending therewith from 5 to 60% of a petroleum naphtha having substantially the same distillation characteristics as said selected cut.

2. Process of manufacturing a flame-resistant solvent mixture suitable for use in dry cleaning from a mixture of normally gaseous hydrocarbons some of which contain one or two carbon atoms per molecule and some of which contain more than two carbon atoms per molecule comprising removing those hydrocarbons having more than two carbon atoms per molecule, intensively chlorinating the remaining hydrocarbons, separating the liquid chlorination products, fractionally distilling said liquid chlorination products to yield a cut having an initial distillation temperature substantially within the range 150° F. to 275° F. and a maximum distillation temperature substantially within the range 195° F. to 350° F., said initial and maximum distillation temperatures being separated by from about 45° F. to about 180° F. and blending said cut with a substantial amount of a naphtha having substantially similar distillation characteristics.

3. Process of manufacturing a flame resistant solvent mixture suitable for use in dry cleaning from a mixture of normally gaseous hydrocarbons some of which contain one or two carbon atoms per molecule and some of which contain more than two carbon atoms per molecule, comprising removing said hydrocarbons containing more than two carbon atoms per molecule, intensively chlorinating the remaining hydrocarbons, separating the liquid chlorination products, fractionally distilling said liquid chlorination products to yield a cut having an initial distillation temperature substantially within the range 160° F. to 215° F. and a maximum distillation temperature substantially within the range 215° F. to 310° F., said initial and maximum distillation temperatures being separated by from about 60° F. to about 150° F. and blending said cut with a substantial amount of a naphtha having distillation characteristics substantially similar to those of said cut.

4. Process of manufacturing a flame-resistant solvent mixture suitable for use in dry cleaning from a mixture of hydrocarbons substantially free from hydrocarbons having more than two carbon atoms per molecule, comprising intensively chlorinating said hydrocarbons, separating the liquid chlorination products, fractionally distilling said liquid chlorination products to yield a cut having an initial distillation temperature substantially within the range 150° F. to 275° F. and a maximum distillation temperature substantially within the range 195° F. to 350° F., said initial and maximum distillation temperatures being separated by from about 45° F. to about 180° F. and blending said cut with a substantial amount of a naphtha having distillation characteristics substantially similar to those of said cut.

5. Process of manufacturing a flame-resistant solvent mixture suitable for use in dry cleaning from a mixture of normally gaseous hydrocarbons consisting largely of hydrocarbons having less than three carbon atoms per molecule, comprising intensively chlorinating said hydrocarbons, separating the liquid chlorination products, fractionally distilling said liquid chlorination products to yield a cut having an initial distillation temperature substantially within the range 160° F. to 215° F. and a maximum distillation temperature substantially within the range 215° F. to 310° F., said initial and maximum distillation temperatures being separated by from about 60° F. to about 150° F. and blending said cut with a substantial amount of a naphtha having distillation characteristics substantially similar to those of said cut.

6. Process of manufacturing a flame-resistant solvent mixture suitable for use in dry cleaning from a mixture of normally gaseous hydrocarbons some of which contain one or two carbon atoms per molecule and some of which contain more than two carbon atoms per molecule comprising removing those hydrocarbons having more than two carbon atoms per molecule, intensively chlorinating the remaining hydrocarbons, separating the liquid chlorination products and fractionally distilling said liquid chlorination products to yield a cut having an initial distillation temperature substantially within the range 150° F. to 275° F. and a maximum distillation temperature substantially within the range 195° F. to 350° F., said initial and maximum distillation temperatures being separated by from about 45° F. to about 180° F.

7. Process of manufacturing a flame-resistant solvent mixture suitable for use in dry cleaning from a mixture of normally gaseous hydrocarbons some of which contain one or two carbon atoms per molecule and some of which contain more than two carbon atoms per molecule, comprising removing said hydrocarbons containing more than two carbon atoms per molecule, intensively chlorinating the remaining hydrocarbons, separating the liquid chlorination products and fractionally distilling said liquid chlorination products to yield a cut having an initial distillation temperature substantially within the range 160° F. to 215° F. and a maximum distillation temperature substantially within the range 215° F. to 310° F., said initial and maximum distillation temperatures being separated by from about 60° F. to about 150° F.

8. Process of manufacturing a flame-resistant solvent mixture suitable for use in dry cleaning from a mixture of hydrocarbons substantially free from hydrocarbons having more than two carbon atoms per molecule, comprising intensively chlorinating said hydrocarbons, separating the liquid chlorination products and fractionally distilling said liquid chlorination products to yield a cut having an initial distillation temperature substantially within the range 150° F. to 275° F. and a maximum distillation temperature substantially within the range 195° F. to 350° F., said initial and maximum distillation temperatures being separated by from about 45° F. to about 180° F.

9. Process of manufacturing a flame-resistant solvent mixture suitable for use in dry cleaning from a mixture of normally gaseous hydrocarbons consisting largely of hydrocarbons having less than three carbon atoms per molecule, comprising intensively chlorinating said hydrocarbons, separating the liquid chlorination products and fractionally distilling said liquid chlorination products to yield a cut having an initial distillation temperature substantially within the range 160° F. to 215° F. and a maximum distillation temperature substantially within the range 215° F. to 310° F., said initial and maximum distillation temperatures being separated by from about 60° F. to about 150° F.

GEORGE L. PARKHURST.